United States Patent
Ohmacht et al.

(10) Patent No.: US 8,370,551 B2
(45) Date of Patent: Feb. 5, 2013

(54) ARBITRATION IN CROSSBAR INTERCONNECT FOR LOW LATENCY

(75) Inventors: Martin Ohmacht, Yorktown Heights, NY (US); Krishnan Sugavanam, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 12/684,287

(22) Filed: Jan. 8, 2010

(65) Prior Publication Data

US 2011/0173357 A1    Jul. 14, 2011

(51) Int. Cl.
*G06F 13/00* (2006.01)
*G06F 13/36* (2006.01)
*G06F 13/368* (2006.01)

(52) U.S. Cl. ............ 710/110; 710/119; 710/120

(58) Field of Classification Search ........... 710/110, 710/119, 120
See application file for complete search history.

(56) References Cited

U.S. PATENT DOCUMENTS

| | | | | |
|---|---|---|---|---|
| 5,555,425 A * | 9/1996 | Zeller et al. | ............. | 710/110 |
| 6,038,630 A * | 3/2000 | Foster et al. | ............. | 710/317 |
| 7,373,445 B2 * | 5/2008 | Hellwig et al. | ............. | 710/112 |
| 7,469,308 B2 * | 12/2008 | Hobson et al. | ............. | 710/120 |
| 7,737,725 B1 * | 6/2010 | Ansari et al. | ............. | 326/41 |
| 8,006,021 B1 * | 8/2011 | Li et al. | ............. | 710/306 |
| 8,156,273 B2 * | 4/2012 | Moran et al. | ............. | 710/110 |
| 2005/0060455 A1 * | 3/2005 | Murdock et al. | ............. | 710/240 |
| 2005/0273544 A1 * | 12/2005 | Fitzsimmons et al. | ............. | 710/317 |
| 2006/0069839 A1 * | 3/2006 | Moyer et al. | ............. | 710/309 |
| 2006/0190649 A1 * | 8/2006 | Ganasan | ............. | 710/113 |
| 2007/0283077 A1 * | 12/2007 | Klein et al. | ............. | 711/100 |
| 2011/0035523 A1 * | 2/2011 | Feero et al. | ............. | 710/110 |

* cited by examiner

*Primary Examiner* — Paul R Myers
*Assistant Examiner* — Christopher a Daley
(74) *Attorney, Agent, or Firm* — Scully, Scott, Murphy & Presser, P.C.; Daniel P. Morris, Esq.

(57) ABSTRACT

A system and method and computer program product for reducing the latency of signals communicated through a crossbar switch, the method including using at slave arbitration logic devices associated with Slave devices for which access is requested from one or more Master devices, two or more priority vector signals cycled among their use every clock cycle for selecting one of the requesting Master devices and updates the respective priority vector signal used every clock cycle. Similarly, each Master for which access is requested from one or more Slave devices, can have two or more priority vectors and can cycle among their use every clock cycle to further reduce latency and increase throughput performance via the crossbar.

22 Claims, 7 Drawing Sheets

ARBITRATION IN CROSSBAR INTERCONNECT FOR LOW LATENCY

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 12/684,367, for "USING DMA FOR COPYING PERFORMANCE COUNTER DATA TO MEMORY"; U.S. patent application Ser. No. 12/684,172 for "HARDWARE SUPPORT FOR COLLECTING PERFORMANCE COUNTERS DIRECTLY TO MEMORY"; U.S. patent application Ser. No. 12/684,190 for "HARDWARE ENABLED PERFORMANCE COUNTERS WITH SUPPORT FOR OPERATING SYSTEM CONTEXT SWITCHING"; U.S. patent application Ser. No. 12/684,496, for "HARDWARE SUPPORT FOR SOFTWARE CONTROLLED FAST RECONFIGURATION OF PERFORMANCE COUNTERS"; U.S. patent application Ser. No. 12/684,429, for "HARDWARE SUPPORT FOR SOFTWARE CONTROLLED FAST MULTIPLEXING OF PERFORMANCE COUNTERS"; U.S. patent application Ser. No. 12/697,799, for "DISTRIBUTED PERFORMANCE COUNTERS"; U.S. patent application Ser. No. 12/684,738, for "LOCAL ROLLBACK FOR FAULT-TOLERANCE IN PARALLEL COMPUTING SYSTEMS"; U.S. patent application Ser. No. 12/696,780, for "LOCAL ROLLBACK FOR FAULT-TOLERANCE IN PARALLEL COMPUTING SYSTEMS"; U.S. patent application Ser. No. 12/684,860, for "PROCESSOR WAKE ON PIN"; U.S. patent application Ser. No. 12/684,174, for "PRECAST THERMAL INTERFACE ADHESIVE FOR EASY AND REPEATED, SEPARATION AND REMATING"; U.S. patent application Ser. No. 12/684,184, for "ZONE ROUTING IN A TORUS NETWORK"; U.S. patent application Ser. No. 12/684,852, for "PROCESSOR WAKEUP UNIT"; U.S. patent application Ser. No. 12/684,642, for "TLB EXCLUSION RANGE"; U.S. patent application Ser. No. 12/684,804, for "DISTRIBUTED TRACE USING CENTRAL PERFORMANCE COUNTER MEMORY"; U.S. patent application Ser. No. 13/008,602, for "PARTIAL CACHE LINE SPECULATION SUPPORT"; U.S. patent application Ser. No. 12/986,349, for "ORDERING OF GUARDED AND UNGUARDED STORES FOR NO-SYNC I/O"; U.S. patent application Ser. No. 12/693,972, for "DISTRIBUTED PARALLEL MESSAGING FOR MULTIPROCESSOR SYSTEMS"; U.S. patent application Ser. No. 12/688,747, for "SUPPORT FOR NON-LOCKING PARALLEL RECEPTION OF PACKETS BELONGING TO THE SAME MESSAGE"; U.S. patent application Ser. No. 12/688 773, for "OPCODE COUNTING FOR PERFORMANCE MEASUREMENT"; U.S. patent application Ser. No. 12/684,776, for "MULTI-INPUT AND BINARY REPRODUCIBLE, HIGH BANDWIDTH FLOATING POINT ADDER IN A COLLECTIVE NETWORK"; U.S. patent application Ser. No. 13/004,007, for "A MULTI-PETASCALE HIGHLY EFFICIENT PARALLEL SUPERCOMPUTER"; U.S. patent application Ser. No. 12/984,252, for "CACHE DIRECTORY LOOK-UP REUSE"; U.S. patent application Ser. No. 13/008,502, for "MEMORY SPECULATION IN A MULTI LEVEL CACHE SYSTEM"; U.S. patent application Ser. No. 13/008,583, for "METHOD AND APPARATUS FOR CONTROLLING MEMORY SPECULATION BY LOWER LEVEL CACHE"; U.S. patent application Ser. No. 12/984,308, for "MINIMAL FIRST LEVEL CACHE SUPPORT FOR MEMORY SPECULATION MANAGED BY LOWER LEVEL CACHE"; U.S. patent application Ser. No. 12/984,329, for "PHYSICAL ADDRESS ALIASING TO SUPPORT MULTI-VERSIONING IN A SPECULATION-UNAWARE CACHE"; U.S. patent application Ser. No. 12/696,825, for "LIST BASED PREFETCH"; U.S. patent application Ser. No. 12/684,693, for "PROGRAMMABLE STREAM PREFETCH WITH RESOURCE OPTIMIZATION"; U.S. patent application Ser. No. 13/004,005, for "FLASH MEMORY FOR CHECKPOINT STORAGE"; U.S. patent application Ser. No. 12/731,796, for "NETWORK SUPPORT FOR SYSTEM INITIATED CHECKPOINTS"; U.S. patent application Ser. No. 12/696,746, for "TWO DIFFERENT PREFETCH COMPLEMENTARY ENGINES OPERATING SIMULTANEOUSLY"; U.S. patent application Ser. No. 12/697,015, for "DEADLOCK-FREE CLASS ROUTES FOR COLLECTIVE COMMUNICATIONS EMBEDDED IN A MULTI-DIMENSIONAL TORUS NETWORK"; U.S. patent application Ser. No. 12/727,967, for "IMPROVING RELIABILITY AND PERFORMANCE OF A SYSTEM-ON-A-CHIP BY PREDICTIVE WEAR-OUT BASED ACTIVATION OF FUNCTIONAL COMPONENTS"; U.S. patent application Ser. No. 12/727,984, for "A SYSTEM AND METHOD FOR IMPROVING THE EFFICIENCY OF STATIC CORE TURN OFF IN SYSTEM ON CHIP (SoC) WITH VARIATION"; U.S. patent application Ser. No. 12/697,043, for "IMPLEMENTING ASYNCHRONOUS COLLECTIVE OPERATIONS IN A MULTI-NODE PROCESSING SYSTEM"; U.S. patent application Ser. No. 13/008,546, for "MULTIFUNCTIONING CACHE"; U.S. patent application Ser. No. 12/697,175 for "I/O ROUTING IN A MULTIDIMENSIONAL TORUS NETWORK"; U.S. patent application Ser. No. 12/684,630 for EAGER PROTOCOL ON A CACHE PIPELINE DATAFLOW; U.S. patent application Ser. No. 12/723,277 for EMBEDDED GLOBAL BARRIER AND COLLECTIVE IN A TORUS NETWORK; U.S. patent application Ser. No. 12/696,764 for GLOBAL SYNCHRONIZATION OF PARALLEL PROCESSORS USING CLOCK PULSE WIDTH MODULATION; U.S. patent application Ser. No. 12/796,411 for IMPLEMENTATION OF MSYNC; U.S. patent application Ser. No. 12/796,389 for NON-STANDARD FLAVORS OF MSYNC; U.S. patent application Ser. No. 12/696,817 for HEAP/STACK GUARD PAGES USING A WAKEUP UNIT; U.S. patent application Ser. No. 12/697,164 for MECHANISM OF SUPPORTING SUB-COMMUNICATOR COLLECTIVES WITH O(64) COUNTERS AS OPPOSED TO ONE COUNTER FOR EACH SUB-COMMUNICATOR; and U.S. patent application Ser. No. 12/774,475 for REPRODUCIBILITY IN BGQ.

BACKGROUND

The present invention relates generally to interconnect devices such as a cross bar switches that connect processors to memory in multiprocessor computer systems, and particularly, to an arbitrating system and methodology for improving low latency through the crossbar switch for increasing performance of parallel computers.

To achieve high performance computing, multiple individual processors have been interconnected to form a multiprocessor computer system capable of parallel processing. Multiple processors can be placed on a single chip, or several chips—each containing one or more processors—become interconnected to form single- or multi-dimensional computing networks into a multiprocessor computer system, such as described in co-pending U.S. Patent Publication No. 2009/0006808 A1 corresponding to U.S. patent application Ser. No. 11/768,905, the whole contents and disclosure of which is incorporated by reference as if fully set forth herein, describing a massively parallel supercomputing system.

Processors in a multiprocessor computer system, such as a massively parallel supercomputing system, typically implement some form of arbitration when communicating signals for storage in a memory through a cross bar interconnect.

BRIEF SUMMARY

There is provided, in one aspect, a system, method and computer program product for providing arbitration when communicating signals for storage in a memory through an interconnect device such as a cross bar switch, that exhibit low latency and improves multiprocessor system performance.

In one aspect, there is provided an arbitration system for an interconnect device adapted for routing signals from among a first plurality of Master devices to a second plurality of Slave devices in a multiprocessing system. The system comprises: an arbitration logic device associated with each Master device and each Slave device, a Slave arbitration logic device associated with a respective Slave device arbitrating access requests received from one or more Master devices requesting access to the Slave device within a first clock cycle, and selecting a first Master device according to a first control signal for access to a Slave device during a first clock cycle and generating an associated selection signal for receipt by a respective first Master arbitration device, and further selecting a second Master device according to a second control signal for access to a Slave device during a second clock cycle and generating an associated selection signal for receipt by a respective second Master arbitration device; and, each arbitration logic device associated with a first Master device and second Master device arbitrating respectively receiving respective associated selection signals received from the Slave arbitration logic device and other Master device selection signals received from other Slave arbitration logic devices and selecting a respective first and second Slave device in the respective first and second clock cycles, the arbitration logic devices associated with the first Master device and second Master device generating signals to couple a respective first Master and first Slave device pair for routing signals within the interconnect during the first clock cycle, and generating further signals to further couple in the second clock cycle a second Master device and second Slave device pair for routing signals within the interconnect; the Slave arbitration logic device updates respective first control and second control signals used in arbitrating requests from Master devices during the respective first and second clock cycles.

Further to this aspect, the Slave arbitration logic device determines the first Master arbitration logic associated with a selected first Master device has accepted the Slave device selection, and, if accepted, the Slave arbitration logic device updating the first control signal; and, if the first Master arbitration logic associated with a selected first Master device has not accepted the Slave device selection, then not updating the first control signal.

Moreover, the Slave arbitration logic device determines the second Master arbitration logic associated with a selected second Master device has accepted the Slave device selection, and, if accepted, the Slave arbitration logic device updating the second control signal.

According to a further aspect of the invention, there is provided a method for routing signals within an interconnect device adapted for routing signals from among a first plurality of Master devices to a second plurality of Slave devices in a multiprocessing system, the method comprising: arbitrating, at a Slave arbitration device, request signals received from one or more Master devices requesting access to an associated Slave device within a first clock cycle, and selecting a first Master device according to a first control signal, and generating an associated selection signal for receipt by a respective first Master arbitration device; and further selecting a second Master device according to a second control signal for access to a Slave device during a second clock cycle, and generating an associated selection signal for receipt by a respective second Master arbitration device; and, arbitrating, at a respective arbitration logic device associated with a first Master device and second Master device, respective associated selection signals received from the Slave arbitration logic device and other Master device selection signals received from other Slave arbitration logic devices and further selecting a respective first and second Slave device within respective first and second clock cycles; generating signals to couple a respective first Master and first Slave device pair for routing signals within the interconnect during said first clock cycle, and generating further signals to further couple within the second clock cycle a second Master device and second Slave device pair for routing signals within the interconnect; and, updating, at the Slave arbitration logic device, respective first control and second control signals used in arbitrating requests from Master devices during said first and second clock cycles.

Further to this aspect, the method further comprises: determining, at the Slave arbitration logic device, whether the first Master arbitration logic associated with a selected first Master device has accepted the Slave device selection, and, if accepted, the Slave arbitration logic device updating the first control signal; and, if the first Master arbitration logic associated with a selected first Master device has not accepted the Slave device selection, then not updating the first control signal.

Moreover, the method further comprises: determining, at the Slave arbitration logic device, whether the second Master arbitration logic associated with a selected second Master device has accepted the Slave device selection, and, if accepted, the Slave arbitration logic device updating the second control signal.

In accordance with even a further aspect, there is provided a computer program product for routing signals within an interconnect device adapted for routing signals from among a first plurality of Master devices to a second plurality of Slave devices in a multiprocessing system, the computer program product comprising: a storage medium readable by a processing circuit and storing instructions for execution by the processing circuit for performing a method comprising: arbitrating, at a Slave arbitration device, request signals received from one or more Master devices requesting access to an associated Slave device within a first clock cycle, and selecting a first Master device according to a first control signal, and generating an associated selection signal for receipt by a respective first Master arbitration device; and further selecting a second Master device according to a second control signal for access to a Slave device during a second clock cycle, and generating an associated selection signal for receipt by a respective second Master arbitration device; and, arbitrating, at a respective arbitration logic device associated with a first Master device and second Master device, respective associated selection signals received from the Slave arbitration logic device and other Master device selection signals received from other Slave arbitration logic devices and further selecting a respective first and second Slave device within the respective first and second clock cycles; generating signals to couple a respective first Master and first Slave device pair for routing signals within the interconnect during the first clock cycle, and generating further signals to further couple within the second clock cycle a second Master device and second Slave device pair for routing signals within the interconnect; and, updating, at the Slave arbitration logic device, respective first control and second control signals used in arbitrating requests from Master devices during said first and second clock cycles.

Further to this aspect, the computer program product includes instructions for determining, at the Slave arbitration logic device, whether the first Master arbitration logic associated with a selected first Master device has accepted the Slave device selection, and, if accepted, the Slave arbitration logic device updating the first control signal; and, if the first Master arbitration logic associated with a selected first Master device has not accepted the Slave device selection, then not updating the first control signal.

Further to this aspect, the computer program product includes instructions for: determining, at the Slave arbitration logic device, whether the second Master arbitration logic associated with a selected second Master device has accepted the Slave device selection, and, if accepted, the Slave arbitration logic device updating the second control signal.

BRIEF DESCRIPTION OF THE SEVERAL VIEWS OF THE DRAWINGS

The objects, features and advantages of the present invention will become apparent to one ordinary skill in the art, in view of the following detailed description taken in combination with the attached drawings, in which.

DETAILED DESCRIPTION

Figure 1:
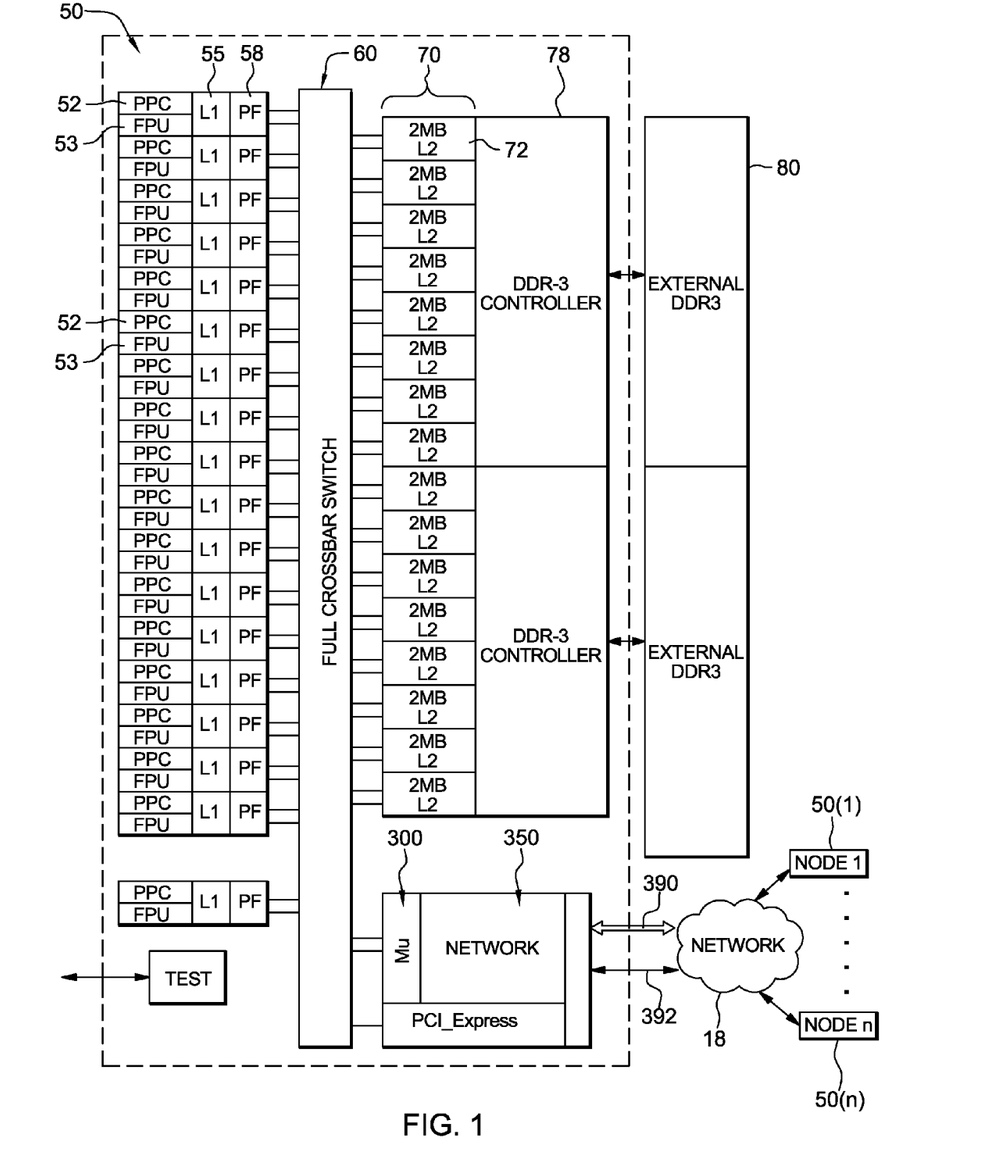
FIG. 1 depicts a schematic of a computing nodechip employed in an example massively parallel computing system according to one embodiment.
Figure 2:
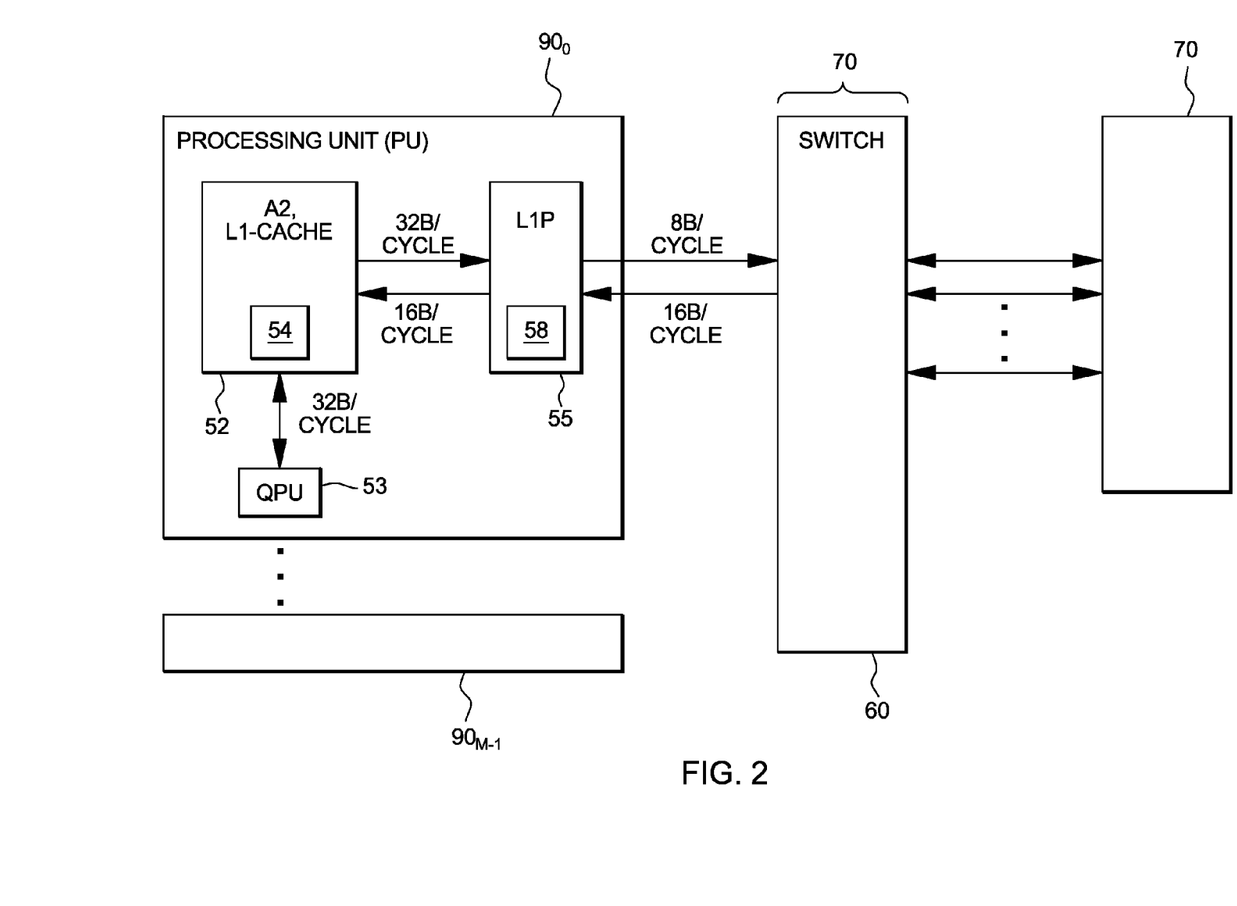
FIG. 2 depicts, in greater detail, a processing unit (PU) including at least one processor core, a floating point unit and an optional pre-fetch cache and a communication path between processor and a memory in the system shown in FIG. 1.

As shown in FIG. 1, and in more detail in FIG. 2, there is a schematic of a single network compute node 50 in a parallel computing system having a plurality of like nodes each node employing an arbitration scheme for reducing throughput latency of an interconnect device according to one embodiment. The computing node 50 for example may be one node in a parallel computing system architecture such as a Blu-Gene® massively parallel computing system comprising a plurality of compute nodes 50(1), . . . 50(n), each node including multiple processor cores and each node connectable to a network such as a torus network, or a collective.

The compute nodechip 50 is a single chip ASIC ("Node-chip") based on low power processing core architecture, though the architecture can use any low power cores, and may comprise one or more semiconductor chips. In the example embodiment depicted, the node employs PowerPC® A2 at 1600 MHz, and support a 4-way multi-threaded 64 b PowerPC implementation. Although not shown, each A2 core may have its own execution unit, instruction unit, and quad floating point unit (QPU). The QPU is an implementation of a quad-wide fused multiply-add SIMD QPX floating point instruction set architecture, producing, for example, eight (8) double precision operations per cycle, for a total of 128 floating point operations per cycle per compute chip. QPX is an extension of the scalar PowerPC floating point architecture. It includes multiple, e.g., thirty-two, 32B-wide floating point registers per thread.

More particularly, the basic nodechip 50 of the massively parallel supercomputer architecture illustrated in FIG. 1 includes multiple symmetric multiprocessing (SMP) cores 52, and in an example embodiment, each core includes a 4-way hardware threaded supporting transactional memory and thread level speculation, and, including a Floating Point Unit (FPU) such as the QPU 53 on each core. In one example implementation, there is provided sixteen or seventeen processor cores 52, and may implement an additional redundant or back-up processor core. In one example, each core operates at a frequency target of 1.6 GHz providing, for example, a 563 GB/s bisection bandwidth to shared L2 cache 70 via an interconnect, such as a full crossbar switch 60. In one example embodiment, there is provided 32 MB of shared L2 cache 70, each of sixteen cores core having associated 2 MB of L2 cache 72 in the example embodiment. There is further provided external DDR SDRAM (e.g., Double Data Rate synchronous dynamic random access) memory 80, as a lower level in the memory hierarchy in communication with the L2. In one embodiment, the compute node employs or is provided with 8-16 GB memory/node. Further, in one embodiment, the node includes 42.6 GB/s DDR3 bandwidth (1.333 GHz DDR3) (2 channels each with chip kill protection).

Moreover, network packet I/O functionality at the node 50 is provided and data throughput increased by implementing a Messaging Unit, "MU" such as MU 300 that includes a plural direct memory access engines to offload a network interface device 350. Each MU at a node includes multiple parallel operating DMA engines, each in communication with the cross bar switch, and the Network Interface 350. In one embodiment, the Network interface unit of the compute node includes, in a non-limiting example: 10 intra-rack and inter-rack interprocessor links 390, each operating at 2.0 GB/s, that, in one embodiment, may be configurable as a 5-D torus, for example); and, an I/O link 392 interfaced with the Network interface Unit 350 at 2.0 GB/s (i.e., a 2 GB/s I/O link (to an I/O subsystem)) is additionally provided.

FIG. 2 depicts, in greater detail, a plurality of processing unit (PU) $90_0, \ldots, 90_{M-1}$, one of which, PU $90_0$ shown including at least one processor core 52, such as the A2 core, the quad floating point unit (QPU) and an optional L1P prefetch cache 55. The PU $90_0$, in one embodiment, includes a 32B wide data path to an associated L1-cache 54, allowing it to load or store 32B per cycle from or into the L1-cache. In a non-limiting embodiment, each core 52 is directly connected to an optional private prefetch unit (level-1 prefetch, L1P) 58, which accepts, decodes and dispatches all requests sent out by the A2 processor core. In one embodiment, a store interface from the A2 to the L1P is 32B wide and the load interface is 16B wide, both operating at processor frequency, for example. The L1P implements a fully associative, 32 entry prefetch buffer, each entry holding cache lines of 128B size, for example. Each PU is connected with the L2 cache 70 via a master port (a Master device) of full crossbar switch 60. In one example embodiment, the shared L2 cache is 32 MB sliced into 16 units, with each 2 MB unit connecting to a slave port of the switch (a Slave device). Every physical address issued via a processor core is mapped to one slice using a selection of programmable address bits or a XOR-based hash across all issued address bits. The L2-cache slices, and the L1 caches of the A2s are hardware-coherent. A group of four slices may be connected via a ring to one of the two DDR3 SDRAM controllers 78 (FIG. 1).

Figure 3:
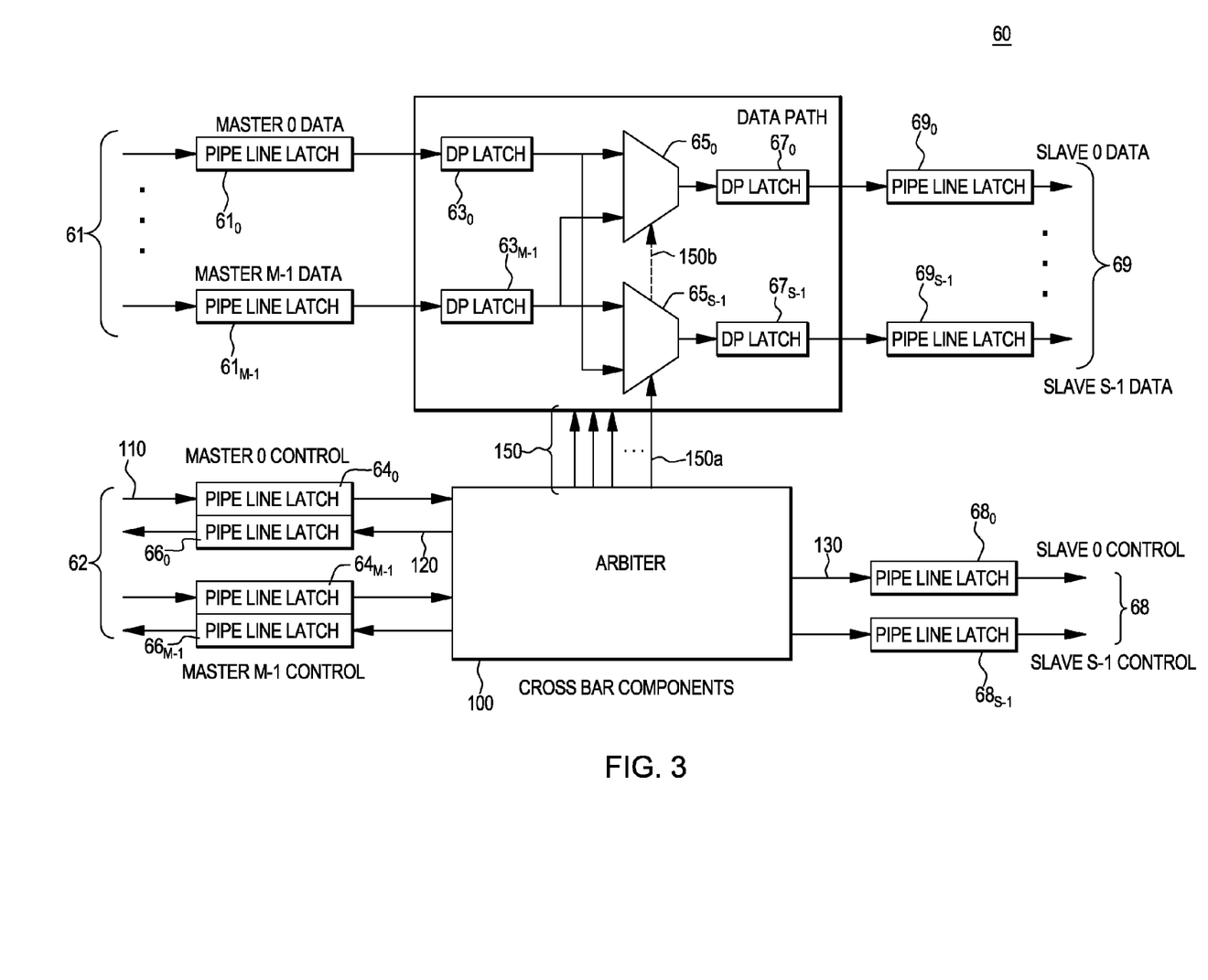
FIG. 3 illustrates further details of the cross-bar interconnect including arbitration device 100 implementing one or more state machines for arbitrating read and write requests received at the crossbar 60 from each of the PU's, for routing to/from the L2 cache slices according to one embodiment.

As shown in FIG. 3, each PU's $90_0 \ldots, 90_{M-1}$, where M is the number of processors cores, and ranges from 0 to 17, for example, connects to the central low latency, high bandwidth crossbar switch 60 via a plurality of master ports including master data ports 61 and corresponding master control ports 62. The central crossbar 60 routes requests received from up to M processor cores via associated pipeline latches $61_0 \ldots, 61_{M-1}$ where they are input to respective data path latch devices $63_0 \ldots, 63_{M-1}$ in the crossbar 60 to write data from the master ports to the slave ports 69 via data path latch devices $67_0 \ldots, 67_{S-1}$ in the crossbar 60 and respective pipeline latch devices $69_0 \ldots, 69_{S-1}$, where S is the number of L2 cache slices, and may comprise an integer number up to 15, in an example embodiment. Similarly, central crossbar 60 routes return data read from memory 70 via associated pipeline latches and data path latches back to the master ports. A write data path of each master and slave port is 16B wide, in example embodiment. A read data return port is 32B wide, in an example embodiment.

As further shown in FIG. 3, the cross-bar includes arbitration device 100 implementing one or more state machines for arbitrating read and write requests received at the crossbar 60 from each of the PU's, for routing to/from the L2 cache slices 70.

In the multiprocessor system on a chip 50, the "M" processors (e.g., 0 to M−1) are connected to the centralized crossbar switch 60 through one or more pipe line latch stages. Similarly, "S" cache slices (e.g., 0 to S−1) are also connected to the crossbar switch 60 through one or more pipeline stages. Any master "M" intending to communicate with a slave "S", sends a request 110 to the crossbar indicating its need to communicate with the slave "S". The arbitrations device 100 arbitrates among the multiple requests competing for the same slave "S".

Processor core connects to the arbitration device 100 via a plurality of Master data ports 61 and Master control ports 62. At a Master control port 62, a respective processor signal 110 requests routing of data latched at a corresponding Master data port 61 to a Slave device associated with a cache slice. Processor request signals 110 are received and latched at the corresponding Master control pipeline latch devices $64_0 \ldots, 64_{M-1}$ for routing to the arbiter every clock cycle. Arbitration device issues arbitration grant signals 120 to the respective requesting processor core 52 from the arbiter 100. Grant signals 120 are latched corresponding Master control pipeline latch devices $66_0 \ldots, 66_{M-1}$ prior to transfer back to the processor. The arbitration device 100 further generates corresponding Slave control signals 130 that are communicated to slave ports 68 via respective Slave control pipeline latch devices $68_0 \ldots, 68_{S-1}$, in an example embodiment. Slave control port signals inform the slaves of the arrival of the data through a respective slave data port $69_0 \ldots, 69_{S-1}$ in accordance with the arbitration scheme issued at that clock cycle. In accordance with arbitration grants selecting a Master Port 61 and Slave Port 69 combination in accordance with an arbitration scheme implemented, the arbitration device 100 generates, in every clock cycle, multiplexor control signals 150 for receipt at a respective multiplexor devices $65_0 \ldots, 65_{S-1}$ to control, e.g., select by turning on, a respective multiplexor. A selected multiplexor enables forwarding of data from master data path latch device $63_0 \ldots, 63_{S-1}$ associated with a selected Master Port to the selected Slave Port 69 via a corresponding connected slave data path latch device $67_0, \ldots, 67_{S-1}$. In FIG. 3, for example, two multiplexor control signals 150a and 150b are shown issued simultaneously for controlling routing of data via multiplexor devices $65_0$ and $65_{S-1}$.

Figure 4:
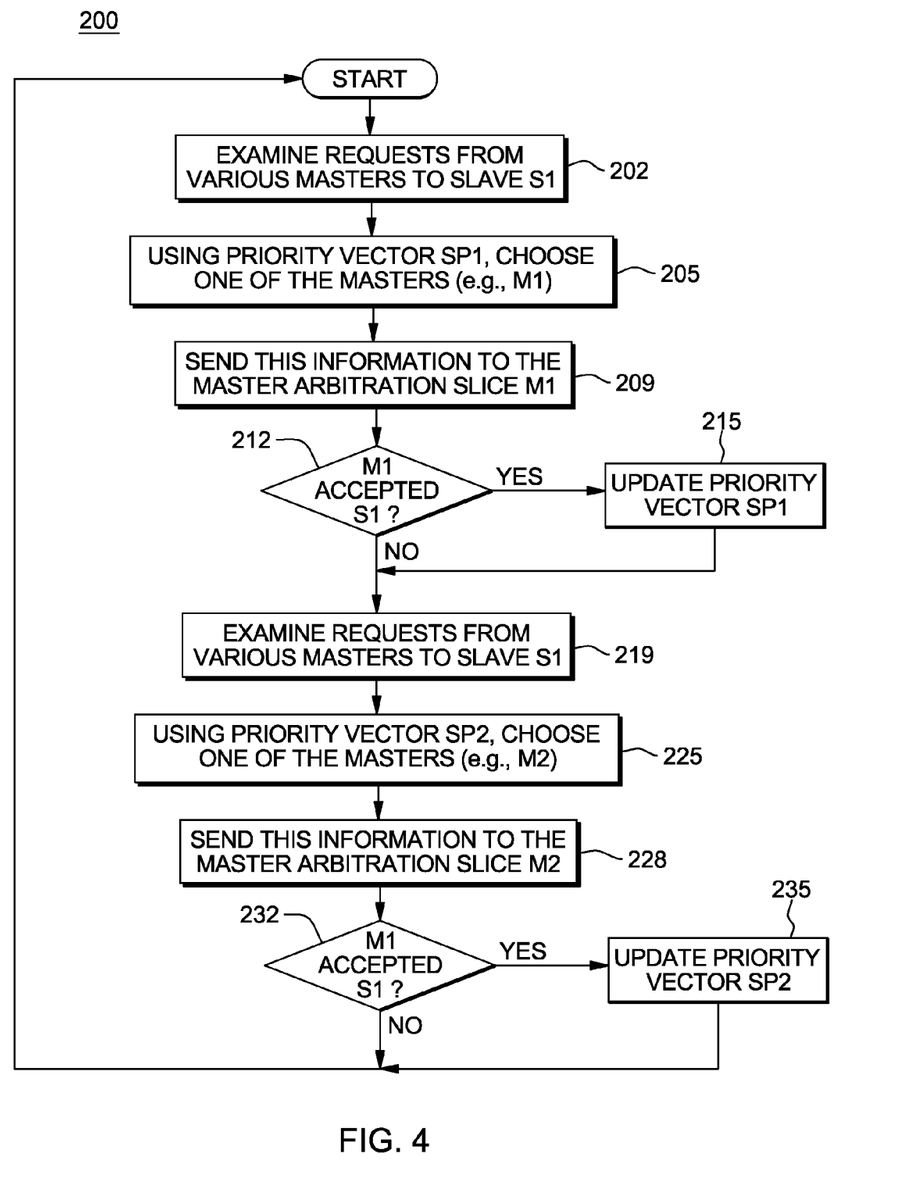
FIG. 4 depicts the first step processing 200 performed at arbitration device 100, and performed by arbitration logic at each slave arbitration slice.

In one example embodiment, the arbitrations device 100 arbitrates among the multiple requests competing for the same slave "S" using a two step mechanism: 1): There are "S" slave arbitration slices. Each slave arbitration slice includes arbitration logic that receives all the pending requests of various Masters to access it. It then uses a round robin mechanism that uses a single round robin priority vector, e.g., bits, to select one Master as the winner of the arbitration. This is done independently by each of the S slave arbitration slices in a clock cycle; 2): There are "M" Master arbitration slices. It is possible that multiple Slave arbitration slices have chosen the same Master in the previous step. Each master arbitration slice uses a round robin mechanism to choose one such slave. This is done independently by each of the "M" master arbitration slices. Though FIG. 4 depicts processing at a single arbitration unit 100, it is understood that both Master arbitration slice and Slave arbitrations slice state machine logic may be distributed within the crossbar switch.

This method ensures fairness, as shown in the signal timing diagram of arbitration device signals of FIG. 6 and depicted in Table 1 below. For example, assuming that Masters 1 through 4 have chosen to access Slave 4. Assuming also that master 0 has pending requests to slaves 0 through 4. It is possible that each of the Slaves 0 through 4 choose master 0 (e.g., in cycle 1). Now Master 0 chooses one of the slaves. Masters 1 through 4 find that no slave has chosen them and hence they do not participate in the arbitration process. Master 0 using a round robin mechanism chooses slave 0 in cycle 1. Slaves 1 through 4, implementing a single round robin priority vector, continue to choose master 0 in cycle 2. Master 0 chooses slave 1 in cycle 2, slave 2 in cycle 3, slave 3 in cycle 4 and slave 4 in cycle 5. Only after slave 4 is chosen in cycle 5, will Slave 4 choose another master using the round robin mechanism. Even though requests were pending from Masters 1 through 4 to slave 4, slave 4 implementing a single round robin priority vector, continued to choose master 0 for cycles 1 through 5. The following describes the cycle and choice and winner via this mechanism using round robin priority:

TABLE 1

| Cycle | Choice of Slave 4 | Winner |
|---|---|---|
| 1 | Master 0 | Master 0 to Slave 0 |
| 2 | Master 0 | Master 0 to Slave 1 |
| 3 | Master 0 | Master 0 to Slave 2 |
| 4 | Master 0 | Master 0 to Slave 3 |
| 5 | Master 0 | Master 0 to Slave 4 (slave 4 wins) |
| 6 | Master 1 | Master 1 to Slave 4 (slave 4 wins) |
| 7 | Master 2 | Master 2 to Slave 4 (slave 4 wins) |
| 8 | Master 3 | Master 3 to Slave 4 (slave 4 wins) |
| 9 | Master 4 | Master 4 to Slave 4 (slave 4 wins) |

In this example, it takes at least 5 clock cycles 160 before the request for Master 1 had even been granted to a slave due to the round robin scheme implemented. However, all transactions to slave 4 are scheduled by cycle 9.

This throughput performance through crossbar 60 may be improved in a further embodiment: rather than each slave using a single round robin priority vector, each slave uses two or more round robin priority vectors. The slave cycles the use of these priority vectors every clock cycle. Thus, in the above example, slave 4 having chosen Master 0 in cycle 1, will choose Master 1 in cycle 2 using a different round robin priority vector. In cycle 2, Master 1 would choose slave 4 as it is the only slave requesting it.

TABLE 2

| Cycle | Chosen by slave 4 | Winner |
|---|---|---|
| 1 | Master 0 | Master 0 to Slave 0 |
| 2 | Master1 | Master 0 to Slave 1; Master 1 to Slave 4 (slave 4 wins) |
| 3 | Master 0 | Master 0 to Slave 2 |
| 4 | Master 2 | Master 0 to Slave 3; Master 2 to Slave 4 (slave 4 wins) |
| 5 | Master 0 | Master 0 to Slave 4 (slave 4 wins) |
| 6 | Master 3 | Master 3 to Slave 4 (slave 4 wins) |
| 7 | Master 4 | Master 4 to Slave 4 (slave 4 wins) |

FIG. 4 depicts the first step processing 200 performed by the arbiter 100. The process 200 is performed by each slave arbitration slice, i.e., arbitration logic executed at each slice (for each Slave 0 to S−1). At 202, each Slave arbitration slice receives all the pending requests of various Masters requesting access to it, e.g., Slave S1, for example. Using a priority vector SP1, the Slave S1 arbitration slice chooses one of the masters (e.g., M1) at 205. The Slave arbitration slice then sends this information to the master arbitration slice M1 at 209. Then, as a result of the arbitration scheme implemented the chosen Master, e.g., Master 1, a determination is made as to whether the M1 has accepted the Slave 51 at 212 or other slaves at that clock cycle. If at 212 it is determined that the M1 has accepted the Slave (e.g., Slave 1), then the priority vector SP1 is updated at step 215 and the process proceeds to 219. Otherwise, if it is determined that the M1 has not accepted the Slave (e.g., Slave 1) the process continues directly to step 219. Then, in the subsequent cycle, as shown at 219, the Slave arbitration slice examines requests from various Masters to Slave S1 and, at 225, uses a second priority vector SP2 to choose one of the Masters (e.g., M2). Continuing, at 228, this information is transmitted to the Master arbitration slice, e.g., for Master M2. Then, at 232, a further determination is made as to whether the Master arbitration for M2 has accepted the Slave S1. If the Master arbitration for M2 has accepted the Slave S1, then at 235, the priority vector is updated to SP2 and the process returns to 202 for continuing arbitration for that Slave slice.

Figure 5:
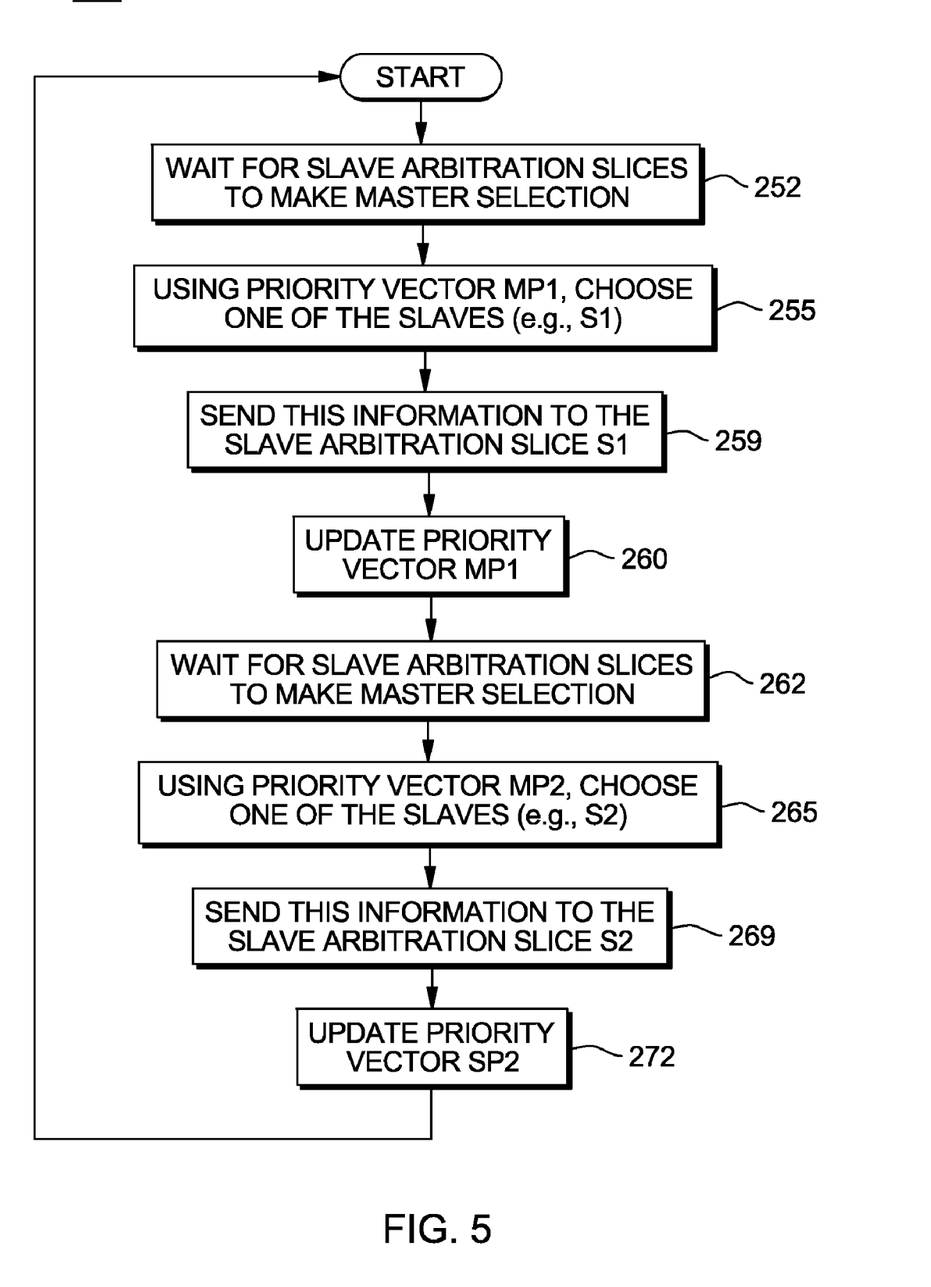
FIG. 5 depicts the second step processing 250 performed at arbitration device 100 and performed by arbitration logic at each master arbitration slice.

In a similar vein, each Master can have two or more priority vectors and can cycle among their use every clock cycle to further increase performance. FIG. 5 depicts the second step processing performed by the arbiter 100. The process 250 is performed by each master arbitration slice, i.e., arbitration logic executed at each slice (for each Master 0 to M−1). Each Master arbitration slice waits until a Slave arbitration slice has selected it (Slave arbitration has selected a Master) at 252. Then, at 255 using a priority vector MP1, Master arbitration slice chooses one of the slaves (e.g., S1). This information is sent to the corresponding Slave arbitration slice S1 at 259. Then, priority vector MP1 is updated at 260. Then, in the subsequent cycle, at 262, the Master arbitration slice waits again for the slave arbitration slices to make a master selection. Using a priority vector MP2, the Master arbitration slice at 265 chooses one of the slaves (e.g., S2). Then, the Master arbitration slice transmits this information to the slave arbitration slice S2 at 269. Finally, the priority vector MP2 is updated at 272 and the process returns to 252 for continuing arbitration for that Master slice.

In one example embodiment, the priority vector used by the slave, e.g., SP1, is M bits long (0 to M−1), as the slave arbitration has to choose one of M masters. Hence, only one bit would be set per cycle as the lowest priority bit, in the example. For example, if a bit 5 of the priority vector is set, then the Master 5 has the lowest priority and the Master 6 would have the highest priority, Master 7 has the second highest priority, etc. The order from highest priority to lowest priority is 6, 7, 8 . . . M−1, 0, 1, 2, 3, 4, 5 in this example priority vector. Further, for example, the Masters arbitration slices 7, 8 and 9 request the slave and Master 7 wins. The priority vector SP1 would be updated so that bit 7 would be set—resulting in priority order from highest to lowest as 8, 9, 10, . . . M−1, 0, 1, 2, 3, 4, 5, 6, 7 in the updated vector. A similar bit vector scheme is further used by the Master arbitration logic devices in determining priority values of slaves to be selected for access within a clock cycle.

The usage of multiple priority vectors both by the masters and slaves and cycling among them result in increased performance. For example, as a result of implementing processes at the arbitration Slave and Master arbitration slices of the example depicted in FIG. 7, it is seen that all transactions to slave S4 are scheduled by the seventh clock cycle 275, thus improving performance as compared to the case of FIG. 6.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
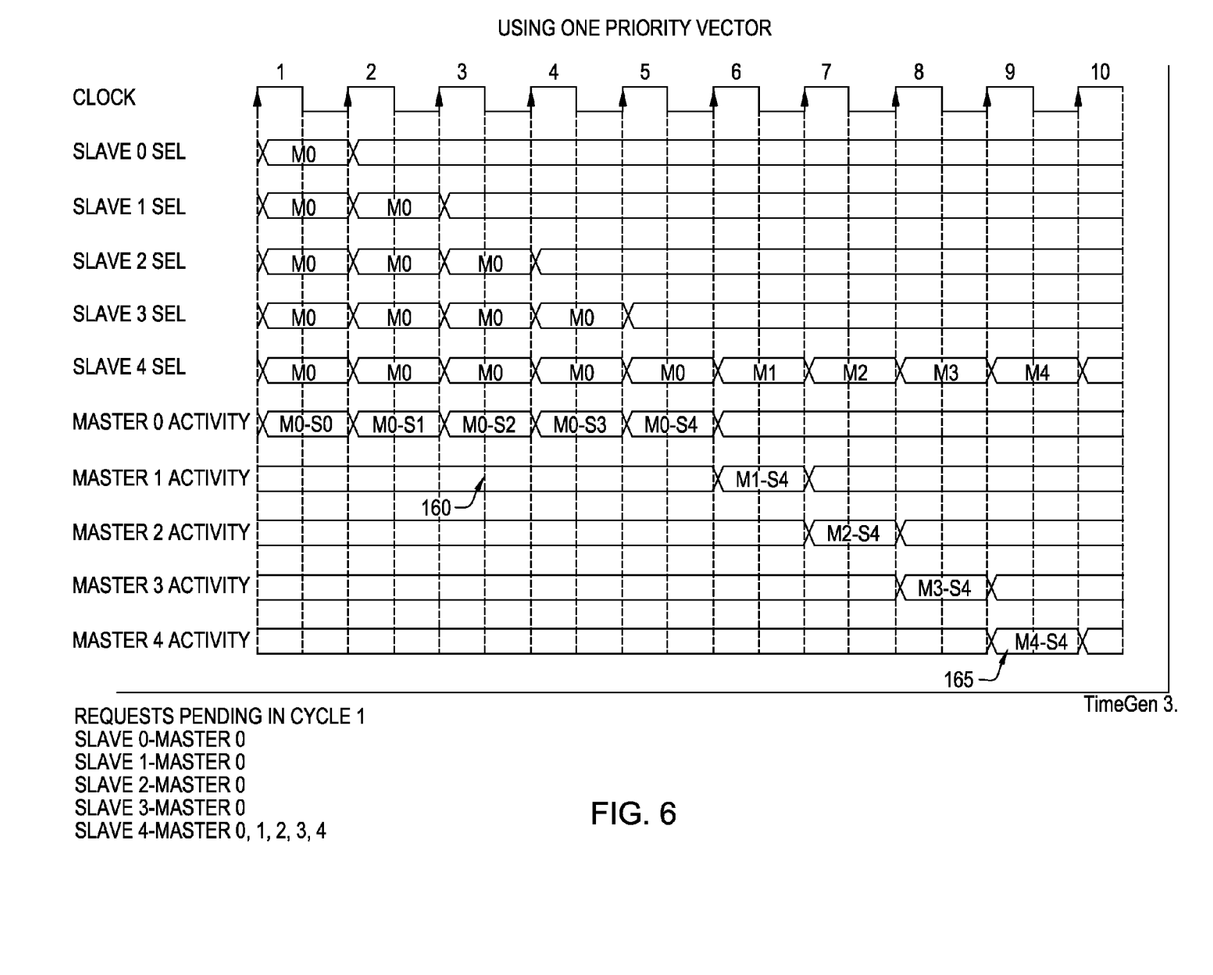
FIG. 6 illustrates a signal timing diagram for signals processed routed within of arbitration device 100 of FIG. 3 using one priority control signal; and, FIG. 7 illustrates a signal timing diagram for signals processed routed within of arbitration device 100 of FIG. 3 using two priority control signals.
Figure 7:
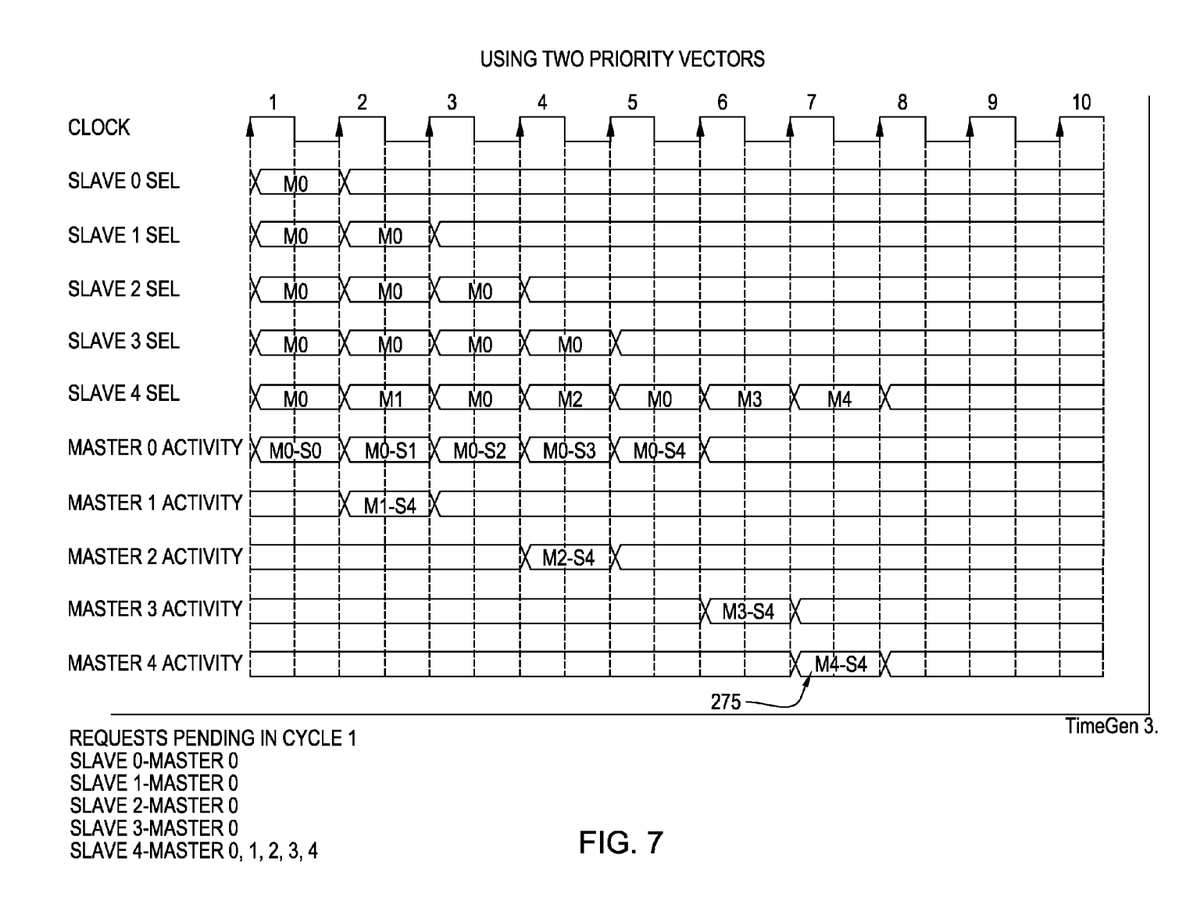

Referring now to FIGS. 4 through 6, the flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Having thus described our invention, what we claim as new, and desire to secure by Letters Patent is:

1. An arbitration system for a configurable crossbar switch device adapted for routing signals in parallel from among a first plurality of Master devices to a second plurality of Slave devices in a multiprocessing system, said system comprising:

arbitration logic device associated with each respective Master device and each respective Slave device, a Slave arbitration logic device associated with a respective Slave device arbitrating access requests received in parallel from one or more Master devices requesting access to said Slave device within a first clock cycle, and selecting a first Master device according to a first control signal for access to a Slave device during a first clock cycle and generating an associated selection signal for receipt by a respective first Master arbitration logic device, and said Slave arbitration logic device further selecting a second different Master device according to a second control signal for access to the Slave device during a second clock cycle and generating an associated selection signal for receipt by a respective second Master arbitration logic device if said first Master arbitration device accepts selection of said Slave device, or selecting said first Master device to access said Slave device during the second clock cycle if said first Master device does not accept said selection of said Slave device in said first clock cycle; and, each arbitration logic device associated with a first Master device and second Master device arbitrating respective associated selection signals received from said Slave arbitration logic device and other Master device selection signals received from other Slave arbitration logic devices and selecting a respective first and second Slave device within the respective first and second clock cycles, said arbitration logic devices associated with the first Master device and second Master device generating signals to configure said crossbar switch to couple a respective first Master and first Slave device pair for routing signals within said configured crossbar switch during said first clock cycle, and generating further signals to configure said crossbar switch to further couple during the second clock cycle a second Master device and second Slave device pair for routing signals within said crossbar switch, said Slave arbitration logic device updates respective said first control and second control signals used in arbitrating requests from said Master devices during successive first and second clock cycles.

2. The system as claimed in claim 1, wherein said Slave arbitration logic device determines said first Master arbitration logic associated with a selected first Master device has accepted the Slave device selection, and, if accepted, said Slave arbitration logic device updating said first control signal; and, if said first Master arbitration logic associated with a selected first Master device has not accepted the Slave device selection, then not updating said first control signal.

3. The system as claimed in claim 2, wherein said Slave arbitration logic device determines said second Master arbitration logic associated with a selected second Master device has accepted the Slave device selection, and, if accepted, said Slave arbitration logic device updating said second control signal.

4. The system as claimed in claim 2, wherein said first control signal includes priority bits, each bit associated with a Master device to indicate a selection priority of said first Master device, and updated to change indication of a first Master device selection priority for use in arbitrating requests from Master devices during a first clock cycle according to an selecting scheme.

5. The system as claimed in claim 4, wherein said selecting scheme is a round robin selection.

6. The system as claimed in claim 3, wherein said second control signal includes priority bits, each bit associated with a Master device to indicate a selection priority of said second Master device, and updated to change indication of a second Master device selection priority for use in arbitrating requests from Master devices during a second clock cycle according to a selecting scheme.

7. The system as claimed in claim 6, wherein said selecting scheme is a round robin selection.

8. The system as claimed in claim 2, wherein each said Slave arbitration logic device associated with Slave devices selecting said first Master device within said first cycle communicates its selection request to a Master arbitration logic device associated with said first Master device, said first Master arbitration logic device using a third control signal to select a requesting first Slave device within said first clock cycle; and, each said Slave arbitration logic device associated with Slave devices selecting said second Master device within said second cycle communicates its selection request to a Master arbitration logic device associated with said second Master device, said second Master arbitration logic device using a fourth control signal to select a requesting second Slave device within the second clock cycle.

9. The system as claimed in claim 8, wherein said Master arbitration device associated with said selected first Master device communicates a request selecting said first Slave device to an associated Slave logic arbitration device, and updates said third control signal for use in arbitrating selection requests from Slave devices, and, said Master arbitration device associated with said selected second Master device communicates a request selecting said second Slave device to an associated Slave logic arbitration device, and updates said fourth control signal for use in arbitrating selection requests from Slave devices.

10. The system as claimed in claim 9, wherein said third and fourth control signal each includes priority bits, each bit associated with a Slave device indicating a selection priority of a Slave device, and updated to change indication of a Slave device selection priority according to a selection scheme.

11. The system as claimed in claim 10, wherein said selection scheme is a Round Robin scheme.

12. A method for routing signals within a configurable crossbar switch device adapted for routing signals in parallel from among a first plurality of Master devices to a second plurality of Slave devices in a multiprocessing system, said method comprising:

arbitrating, at each Slave arbitration device associated with a respective Slave device of said second plurality of Slave devices, request signals received in parallel from one or more Master devices requesting access to a Slave device of said second plurality of Slave devices within a first clock cycle, and said Slave device selecting a first Master device according to a first control signal, and generating an associated selection signal for receipt by a first Master arbitration logic device; and further selecting, by said Slave arbitration logic device, a second different Master device according to a second control signal for access to the Slave device during a second clock cycle, and generating an associated selection signal for receipt by a respective second Master arbitration logic device if said first Master arbitration device accepts selection of said Slave device, or selecting said first Master device to access said Slave device during the second clock cycle if said first Master device does not accept said selection of said Slave device in said first clock cycle; and, arbitrating, at a respective arbitration logic device associated with the selected first Master device and second Master device, respective associated selection signals received from said Slave arbitration logic device and other Master device selection signals received from other Slave arbitration logic devices and further selecting a respective first and second Slave device within respective said first and second clock cycle, generating signals to configure said crossbar switch to couple a respective first Master device and said Slave device pair for routing signals within said configured crossbar switch during said first clock cycle, and generating further signals to configure said crossbar switch to further couple within the second clock cycle a second Master device and said Slave device pair for routing signals within said crossbar switch, and, updating, at said Slave arbitration logic device, respective said first control and second control signals used in arbitrating requests from Master devices during successive first and second clock cycles.

13. The method as claimed in claim 12, further comprising: determining, at said Slave arbitration logic device, whether said first Master arbitration logic associated with a selected first Master device has accepted the Slave device selection, and, if accepted, said Slave arbitration logic device updating said first control signal; and, if said first Master arbitration logic associated with a selected first Master device has not accepted the Slave device selection, then not updating said first control signal.

14. The method as claimed in claim 13, further comprising: determining, at said Slave arbitration logic device, whether said second Master arbitration logic associated with a selected second Master device has accepted the Slave device selection, and, if accepted, said Slave arbitration logic device updating said second control signal.

15. The method as claimed in claim 13, wherein said first control signal includes priority bits, each bit associated with a Master device to indicate a selection priority of said first Master device, said updating including changing indication of a first Master device selection priority for use in arbitrating requests from Master devices during said first clock cycle according to an selecting scheme.

16. The method as claimed in claim 14, wherein said second control signal includes priority bits, each bit associated with a Master device to indicate a selection priority of said second Master device, said updating including changing indication of a second Master device selection priority for use in arbitrating requests from Master devices during said second clock cycle according to a selecting scheme.

17. The method as claimed in claim 14, further comprising: communicating, by said Slave arbitration logic devices associated with Slave devices selecting said first Master device within said first clock cycle, its selection request to a Master arbitration logic device associated with said first Master device, said first Master arbitration logic device using a third control signal to select a requesting first Slave device; and, communicating, by each said Slave arbitration logic device associated with Slave devices selecting said second Master device within said second cycle, its selection request to a Master arbitration logic device associated with said second Master device, said second Master arbitration logic device using a fourth control signal to select a requesting second Slave device.

18. The method as claimed in claim 17, further comprising: communicating, by said Master arbitration device associated with said selected first Master device, a request selecting said first Slave device to an associated Slave logic arbitration device, and updating said third control signal for use in arbitrating selection requests from Slave devices during said first clock cycle, and, communicating, by said Master arbitration device associated with said selected second Master device, a request selecting said second Slave device to an associated Slave logic arbitration device, and updating said fourth control signal for use in arbitrating selection requests from Slave devices during said second clock cycle.

19. The method as claimed in claim 18, wherein said third and fourth control signal each includes priority bits, each bit associated with a Slave device indicating a selection priority of a Slave device, said updating including changing indication of a Slave device selection priority according to a selection scheme.

20. A computer program product for routing signals within a centralized configurable crossbar switch device adapted for routing signals in parallel from among a first plurality of Master devices to a second plurality of Slave devices in a multiprocessing system, the computer program product comprising:

a storage medium readable by a processing circuit and storing instructions for execution by the processing circuit for performing a method comprising:

arbitrating, at each Slave arbitration device associated with a respective Slave device of said second plurality of Slave devices, request signals received in parallel from one or more Master devices requesting access to a Slave device of said second plurality of Slave devices within a first clock cycle, and said Slave device selecting a first Master device according to a first control signal, and generating an associated selection signal for receipt by a first Master arbitration logic device; and further selecting, by said Slave arbitration device, a second Master device according to a second control signal for access to the Slave device during a second clock cycle, and generating an associated selection signal for receipt by a respective second Master arbitration logic device if said first Master arbitration device accepts selection of said Slave device, or selecting said first Master device to access said Slave device during the second clock cycle if said first Master device does not accept said selection of said Slave device in said first clock cycle; and, arbitrating, at a respective arbitration logic device associated with the selected first Master device and second Master device, respective associated selection signals received from said Slave arbitration logic device and other Master device selection signals received from other Slave arbitration logic devices and further selecting a respective first and second Slave device within respective said first and second clock cycles, generating signals to configure said crossbar switch to couple a respective first Master and first Slave device pair for routing signals within said configured crossbar switch during said first clock cycle, and generating further signals to configure said crossbar switch to further couple within the said second clock cycle a second Master device and second Slave device pair for routing signals within said configured crossbar switch, and, updating, at said Slave arbitration logic device, respective said first control and second control signals used in arbitrating requests from Master devices during successive first and second clock cycles.

21. The computer program product as claimed in claim 20, said method further comprising:

determining, at said Slave arbitration logic device, whether said first Master arbitration logic associated with a selected first Master device has accepted the Slave device selection, and, if accepted, said Slave arbitration logic device updating said first control signal; and, if said first Master arbitration logic associated with a selected first Master device has not accepted the Slave device selection, then not updating said first control signal.

22. The computer program product as claimed in claim 21, said method further comprising:
    determining, at said Slave arbitration logic device, whether said second Master arbitration logic associated with a selected second Master device has accepted the Slave device selection, and, if accepted, said Slave arbitration logic device updating said second control signal.

* * * * *